(No Model.)
W. W. STALL.
RIM FOR VEHICLE WHEELS.
No. 509,260. Patented Nov. 21, 1893.
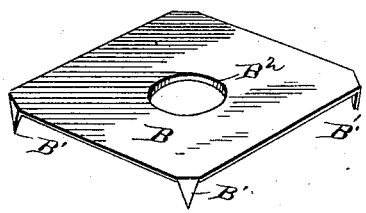
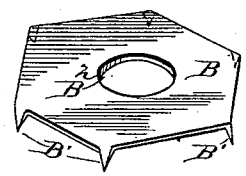
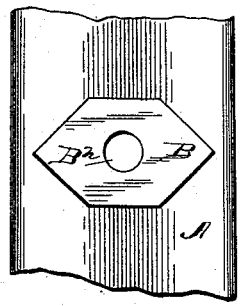
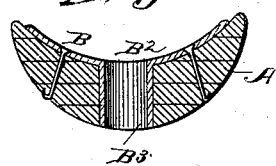
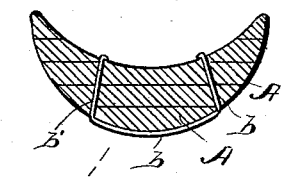
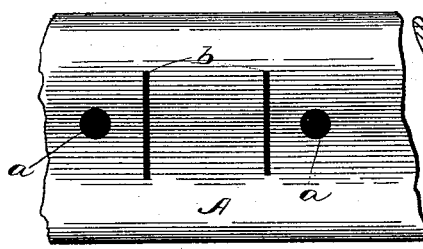
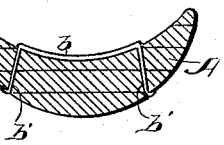
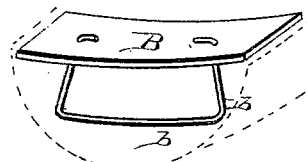
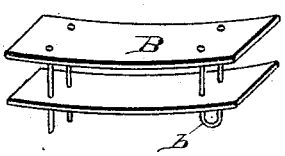
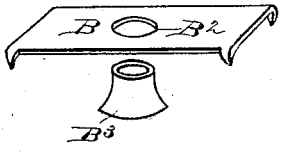
Witnesses
J. M. Fowler Jr.
Chas. H. O'Neill
Inventor
William W. Stall
by his Attorney
THE NATIONAL LITHOGRAPHING COMPANY,
WASHINGTON, D. C.

UNITED STATES PATENT OFFICE.

WILLIAM W. STALL, OF BOSTON, MASSACHUSETTS.

RIM FOR VEHICLE-WHEELS.

SPECIFICATION forming part of Letters Patent No. 509,260, dated November 21, 1893.

Application filed June 10, 1893. Serial No. 477,237. (No model.)

*To all whom it may concern:*

Be it known that I, WILLIAM W. STALL, a citizen of the United States, residing at Boston, in the county of Suffolk and State of Massachusetts, have invented certain new and useful Improvements in Rims or Fellies for Wheels; and I do hereby declare the following to be a full, clear, and exact description of the invention, such as will enable others skilled in the art to which it appertains to make and use the same.

This invention relates to that class of rims or fellies for vehicle wheels composed of, or built up from a number of ribbons or strips of wood cemented one upon or within another to form a single composite ring. Such fellies or rims have been used chiefly in connection with pneumatic or other elastic tires of large diameter, cross sectionally, and with hubs suspended within them by metal spokes adjusted up to tension, and have been made broad to accommodate such tires and of flat cross section to secure lightness. It has been found, in the practical use of such fellies or rims, that as the pull or strain of the spokes is exerted in the central line of the rim, the rim is liable to split, in the line of the spoke holes, and it will also be liable to split in that line should wooden spokes be used in making up wheels with such rims, as the outward thrust of such wooden spokes would be exerted at the central line of the rim, and make the rim practically unyielding at that point, and bring undue strain upon the edges of the rim in ordinary use, and particularly upon encountering obstacles.

The object of my present invention is to provide a reinforce, stay, or brace for such laminated rims, thereby avoiding a serious objection to their employment, and adding materially to their strength and enduring qualities.

To this end my invention consists in the matters to be hereinafter described in detail and then pointed out in the claims at the close of this specification.

In the accompanying drawings, Figures 1 and 2, are perspective views of stays or braces embraced in my invention. Fig. 3, is a plan view of a stay applied to a rim. Fig. 4, is another form of the type or style of stay shown in Figs. 1, 2 and 3. Fig. 5, is a side elevation of another form of stay. Fig. 6, illustrates by plan view the form of stay shown in Fig. 5, as applied to a rim. Figs. 7 and 8, are sections of a rim provided with stays in accordance with my invention. Figs. 9, 10 and 11, illustrate combinations of the forms of stays already described.

As the particular form of the reinforce or brace may be varied in construction, as well as the mode of application, I have illustrated in the drawings, in connection with sections of laminated rims A, several of the forms which are found to be best adapted to the end sought.

As illustrated in Figs. 1, 2 and 3 the reinforce or stay is formed from a piece of sheet metal, and consists of a flat or curved web B, of any preferred outline, provided at its edges or angles with spurs or tangs B' bent to stand at an angle, preferably a right angle, with the web B so that they may be driven or forced into the rim to secure the stay immovably and give lateral support to the rim. This form of stay may be provided centrally with an opening $B^2$ of a size to receive the shank of a spoke nipple, said stay being so located as to surround the spoke hole $a$ in the rim A, and thus give lateral support thereto, at the same time distributing the pressure exerted by the pull of a spoke, over a larger area than the head or flange of the spoke nipple, so that aside from preventing the splitting of the rim on the line of the spoke holes, this stay distributes the pressure of the nipples outward toward the edges of the rim, thus relieving the central line of the rim of much strain. Such stay A may also be arranged in the same relation with regard to the opening formed in the rim for the reception of the valve nipple of pneumatic tires.

I of course do not expect to confine myself to the use of sheet metal in constructing this form of stay, as they may be made of cast metal, and provided with a central tubular boss $B^3$ to pass partly or entirely through the rim thus forming a permanent metal bushing for the spoke holes, within which the spoke nipples may be seated, as shown in Fig. 4.

When stays A of cast metal are employed, they are preferably provided at suitable points with perforations $B^4$ so that tacks, or rivets $B^5$ may be used to secured them in place.

The brace or stay A shown in Figs. 5, 6, 7 and 8, consists of a length or strip of sheet metal or wire bent at an angle, preferably a right angle, at the ends to form spurs or tangs $b'$, at each end of the body or web $b$. As in the form of stay before described the body or web $b$ may be curved longitudinally to approximate the transverse curve of the surface of the rim where it is to be applied, or it may be flat, and be given its curve in the act of driving or forcing its tangs $b'$ into the rim. Stays of this form are designed to be secured between the spoke holes of the rim, and one, two or more may be secured between each two adjacent spoke holes, though in practice I do not contemplate using more than two of said stays between adjacent spoke holes, at the most, as they may be placed, one adjacent to each side of each spoke hole, where the strain is greatest, and thus give ample transverse support to the rim. It will be understood that these stays may be attached to either the inner or outer (grooved) side of the rim, or both, though in order to prevent an unbroken inner rim surface to the view, I prefer to apply said stays within the tire groove of the rim where they are concealed from view by the tire. It will be understood, of course, that the tangs or spurs $B'$ or $b'$ may be of a length to extend but partly through the rim, or entirely therethrough to admit of clinching. It is also my purpose in some instances to employ a double stay, as illustrated in Figs. 9, 10 and 11, one member thereof being located outside the rim, and the other at the inside thereof, and the two being connected in a suitable manner. In Fig. 9 a plate or web B is arranged within the groove of the rim, and secured therein by means of the tangs $b'$ of another stay, the web $b$ of which is located at the inner side of the rim. In Fig. 10 two plate like stays are shown, one arranged on each side of the rim, the two being connected by rivets or by a staple like stay $b\ b'$.

In the form shown in Fig. 11 a stay, such as shown in Fig. 1, is used in connection with such a stay as is shown in Fig. 4, the two being connected by rivet-flanging the end of the tubular boss $B^3$ which passes through the spoke holes $a$ of the rim and through the stay B.

It will be understood, of course, that in any of the several arrangements shown in the drawings the positions of the parts may be reversed without departing from my invention.

I am aware that it has been the custom heretofore, to provide the joints of solid wooden fellies with metal "felly clips," embracing the inner surface and sides of said felly at the joints to impart strength to said joints in a radial direction, but this is not the subject or purpose of my invention, and I make no claim to such construction.

I am also aware, that it has been proposed to drive or press thin sharpened metal rings into the substance of a solid wooden felly, at points where the spoke tenons are to enter, but such construction would be impractical in connection with a laminated or multi-ply wooden felly, to which my invention relates, and I therefore do not wish to claim such a construction.

My invention relates more particularly to laminated or multiply wooden fellies built up of successive thin layers or rings of wood, and having but little thickness with relation to their width, and resides in applying thereto a transverse stay or brace to distribute the pressure or strain of the spokes throughout the width of such thin fellies.

What I claim is—

1. The combination with a laminated or multiply felly for wheels, of a transversely arranged stay secured adjacent to the spoke holes of said felly to distribute the strain of the spokes laterally thereon, substantially as described.

2. The combination with a laminated or multiply felly for wheels, of a transversely arranged stay secured adjacent to the spoke holes of said felly by spurs or tangs projecting from said stay, substantially as described.

3. The combination with a laminated or multiply felly for wheels, of a transversely arranged stay secured to surround the spoke holes of said felly, to distribute the strain of the spokes laterally thereon, substantially as described.

4. The combination with a laminated or multiply felly for wheels, of a transversely arranged stay secured by tangs or spurs projecting from said stay to surround the spoke hole of said felly, substantially as described.

5. The combination with a laminated or multiply felly for wheels, of a transversely arranged stay applied to one side of said felly and another stay applied at the opposite side of the felly and secured to the first named stay, substantially as described.

In testimony whereof I affix my signature in presence of two witnesses.

WILLIAM W. STALL.

Witnesses:
I. F. HUNTINGTON,
H. B. LORD.